(12) United States Patent
Osawa et al.

(10) Patent No.: US 11,179,972 B2
(45) Date of Patent: *Nov. 23, 2021

(54) TIRE

(71) Applicant: SUMITOMO RUBBER INDUSTRIES, LTD., Hyogo (JP)

(72) Inventors: Takaki Osawa, Hyogo (JP); Mari Mishima, Hyogo (JP)

(73) Assignee: SUMITOMO RUBBER INDUSTRIES, LTD., Hyogo (JP)

( * ) Notice: Subject to any disclaimer, the term of this patent is extended or adjusted under 35 U.S.C. 154(b) by 185 days.

This patent is subject to a terminal disclaimer.

(21) Appl. No.: 16/351,895

(22) Filed: Mar. 13, 2019

(65) Prior Publication Data

US 2019/0308461 A1    Oct. 10, 2019

(30) Foreign Application Priority Data

Apr. 6, 2018 (JP) .............................. JP2018-074058

(51) Int. Cl.
  *B60C 11/03* (2006.01)
  *B60C 11/12* (2006.01)
  *B60C 15/00* (2006.01)
  *B60C 11/13* (2006.01)

(52) U.S. Cl.
  CPC ........ *B60C 11/0304* (2013.01); *B60C 11/032* (2013.01); *B60C 11/0306* (2013.01);
  (Continued)

(58) Field of Classification Search
  CPC ..... B60C 2011/0383; B60C 2011/0381; B60C 2011/0348; B60C 2011/0351
  See application file for complete search history.

(56) References Cited

U.S. PATENT DOCUMENTS

D830,956 S  * 10/2018 Mishima ................. B60C 11/04
                                                                  D12/521
D870,021 S  * 12/2019 Mishima ................. B60C 11/12
                                                                  D12/521

(Continued)

FOREIGN PATENT DOCUMENTS

DE     102012200838 A1   10/2012
EP         1695844 A1    8/2006

(Continued)

OTHER PUBLICATIONS

Translation of JP 2003-211921 (Year: 2003).*

(Continued)

*Primary Examiner* — Marc C Howell
*Assistant Examiner* — John J DeRusso
(74) *Attorney, Agent, or Firm* — Greenblum & Bernstein P.L.C.

(57) ABSTRACT

A tyre has a tread portion. The tread portion includes a land region defined between a first edge extending in a tyre circumferential direction and a second edge extending in the tyre circumferential direction. The land region is provided with a first lateral groove extending from the first edge toward the second edge and terminating within the land region, a vertical groove connected with the first lateral groove, extending in the tyre circumferential direction, and having both end portions terminating within the land region, and a sipe connected with the vertical groove and extending therefrom toward the second edge.

20 Claims, 8 Drawing Sheets

(52) U.S. Cl.
CPC ...... *B60C 11/1204* (2013.01); *B60C 11/1236* (2013.01); *B60C 15/0027* (2013.01); *B60C 11/1384* (2013.01); *B60C 11/1392* (2013.01); *B60C 2011/0348* (2013.01); *B60C 2011/0351* (2013.01); *B60C 2011/0353* (2013.01); *B60C 2011/0355* (2013.01); *B60C 2011/0365* (2013.01); *B60C 2011/0367* (2013.01); *B60C 2011/0372* (2013.01); *B60C 2011/0381* (2013.01); *B60C 2011/0383* (2013.01); *B60C 2011/0388* (2013.01); *B60C 2011/1213* (2013.01); *B60C 2011/1227* (2013.01)

(56) References Cited

U.S. PATENT DOCUMENTS

| | | | | |
|---|---|---|---|---|
| 2008/0135150 | A1* | 6/2008 | Kiwaki | B60C 11/12 152/209.25 |
| 2017/0057298 | A1* | 3/2017 | Li | B60C 11/04 |
| 2017/0210175 | A1* | 7/2017 | Yoshimura | B60C 11/12 |

FOREIGN PATENT DOCUMENTS

| | | |
|---|---|---|
| EP | 3162594 A1 | 5/2017 |
| EP | 3290234 A1 | 3/2018 |
| JP | H07290909 A | 11/1995 |
| JP | 2003211921 A | 7/2003 |
| JP | 2007237816 A | 9/2007 |
| JP | 2008137574 A | 6/2008 |
| JP | 2014097725 A | 5/2014 |
| JP | 2015047977 A | 3/2015 |
| JP | 2016-107912 A | 6/2016 |
| WO | 2016194292 A1 | 12/2016 |

OTHER PUBLICATIONS

Translation of JP 2008-137574 (Year: 2008).*
Translation of EP 1,695,844 (Year: 2006).*
European Search Report, European patent Office, Application No. 19161230.8, dated Aug. 13, 2019.

* cited by examiner

TIRE

TECHNICAL FIELD

The present invention relates to a tyre, specifically, to a tyre suitable for running on a snowy road surface.

BACKGROUND ART

Japanese unexamined Patent Application Publication No. 2016-107912 (Patent Literature 1) has proposed a pneumatic tyre provided having a tread portion provided with lateral grooves each extending from a main groove and having an inner end terminating within a land region and vertical slots each connected with a respective one of the lateral grooves and having both ends terminating within the land region.

SUMMARY OF THE INVENTION

In the tyres disclosed in the Patent Literature 1, when running on a snowy road surface, snow tends to clog in the lateral grooves and the vertical slots.

Then, once these grooves and the like are clogged with snow, on-snow traction, which is supposed to be obtained by using these grooves and the like, cannot be obtained, therefore, it is possible that on-snow performance is deteriorated.

The present invention was made in view of the above, and a primary object thereof is to provide a tyre capable of sustainably exerting excellent on-snow performance.

In one aspect of the present invention, a tyre comprises a tread portion comprising a land region defined between a first edge extending in a tyre circumferential direction and a second edge extending in the tyre circumferential direction, wherein the land region is provided with a first lateral groove extending from the first edge toward the second edge and terminating within the land region, a vertical groove connected with the first lateral groove, extending in the tyre circumferential direction, and having both end portions terminating within the land region, and a sipe connected with the vertical groove and extending therefrom toward the second edge.

In another aspect of the invention, it is preferred that the first lateral groove is inclined with respect to a tyre axial direction.

In another aspect of the invention, it is preferred that the first lateral groove includes a portion in which a groove width thereof is increased as it goes toward the vertical groove.

In another aspect of the invention, it is preferred that the vertical groove has a depth smaller than that of the first lateral groove.

In another aspect of the invention, it is preferred that the sipe extends to the second edge.

In another aspect of the invention, it is preferred that the sipe has a depth larger than that of the vertical groove.

In another aspect of the invention, it is preferred that at least a part of the sipe is in a region obtained by extending the first lateral groove in a longitudinal direction thereof.

In another aspect of the invention, it is preferred that the first lateral groove and the sipe are inclined in a same direction with respect to the tyre axial direction.

In another aspect of the invention, it is preferred that the land region has a chamfered portion including an inclined surface positioned between a ground contacting surface and a side wall on a side of the second edge of the land region, and the sipe extends to the chamfered portion.

In another aspect of the invention, it is preferred that the tread portion includes another land region adjacent to the land region with a main groove arranged on a side of the second edge of the land region therebetween, and said another land region is provided with a second lateral groove connected with the main groove.

In another aspect of the invention, it is preferred that the sipe is connected with the main groove, and a region obtained by extending the sipe along a longitudinal direction thereof overlaps with an end portion of the second lateral groove.

DESCRIPTION OF THE PREFERRED EMBODIMENT

An embodiment of the present invention will now be described in conjunction with accompanying drawings.

Figure 1:
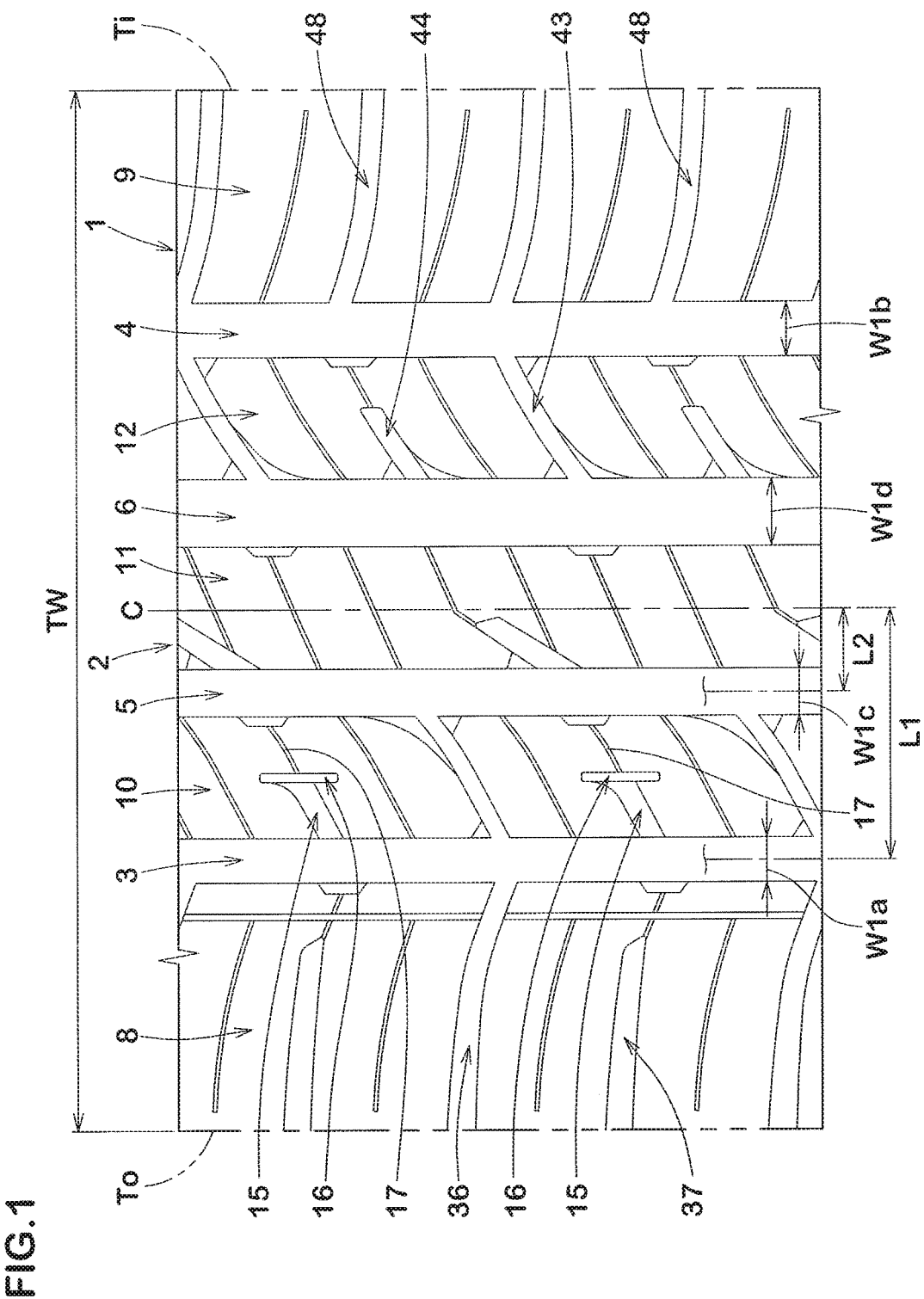
FIG. 1 is a development view of a tread portion of a tyre as an embodiment of the present invention.

FIG. 1 is a development view of a tread portion 2 of a tyre 1 according to an embodiment of the present invention. The tyre 1 in this embodiment is a pneumatic tyre for a passenger car and suitably used as an all-season tyre which can be also used for running on a snowy road surface, for example. However, the tyre 1 of the present invention is not limited to such an embodiment.

As shown in FIG. 1, the tyre 1 in this embodiment has the tread portion 2 whose position when mounted on a vehicle is specified, for example. The tread portion 2 has an outer tread edge (To) and an inner tread edge (Ti). When the tyre 1 is mounted on a vehicle, the outer tread edge (To) is positioned on an outer side of the vehicle and the inner tread edge (Ti) is positioned on an inner side of the vehicle. The mounting position of the tyre 1 on a vehicle is indicated by letters or symbols on at least one of sidewall portions (not shown), for example.

In a case of a pneumatic tyre, the tread edges (To) and (Ti) are defined as outer most ground contacting positions in a tyre axial direction of the tyre 1 when the tyre 1 in a standard state is in contact with a flat surface with zero camber angle by being loaded with a standard tyre load. The standard state is a state in which the tyre is mounted on a standard rim, inflated to a standard inner pressure, and loaded with no tyre load. In this specification, unless otherwise noted, dimensions and the like of various parts of the tyre are values measured in the standard state.

The "standard rim" is a wheel rim specified for the concerned tyre by a standard included in a standardization system on which the tyre is based, for example, the "normal wheel rim" in JATMA, "Design Rim" in IRA, and "Measuring Rim" in ETRTO.

The "standard inner pressure" is air pressure specified for the concerned tyre by a standard included in a standardization system on which the tyre is based, for example, the "maximum air pressure" in JATMA, maximum value listed in the "TIRE LOAD LIMITS AT VARIOUS COLD INFLATION PRESSURES" table in TRA, and "INFLATION PRESSURE" in ETRTO.

The "standard tyre load" is a tyre load specified for the concerned tyre by a standard included in a standardization system on which the tyre is based, for example, the "maximum load capacity" in JATMA, maximum value listed in "TIRE LOAD LIMITS AT VARIOUS COLD INFLATION PRESSURES" table in TRA, and "LOAD CAPACITY" in ETRTO.

The tread portion 2 is provided with a plurality of main grooves extending continuously in a tyre circumferential direction. The plurality of the main grooves includes an outer shoulder main groove 3, an inner shoulder main groove 4, an outer crown main groove 5, and an inner crown main groove 6. Each of the main grooves 3 to 6 in this embodiment extends linearly, for example but they are not limited to such an embodiment and they may be configured to extend in a zigzag manner, for example.

The outer shoulder main groove 3 is arranged closest to the outer tread edge (To) among the plurality of the main grooves, for example. The inner shoulder main groove 4 is arranged closest to the inner tread edge (Ti) among the plurality of the main grooves, for example. The outer crown main groove 5 is arranged between the outer shoulder main groove 3 and a tyre equator (C), for example. The inner crown main groove 6 is arranged between the inner shoulder main groove 4 and the tyre equator (C), for example.

It is preferred that a distance L1 between the tyre equator (C) and a groove center line of each of the outer shoulder main groove 3 and the inner shoulder main groove 4 is in a range of from 0.20 to 0.30 times a tread width TW, for example. It is preferred that a distance L2 between the tyre equator (C) and a groove center line of each of the outer crown main groove 5 and the inner crown main groove 6 is in a range of from 0.05 to 0.15 times the tread width TW, for example. The tread width TW is a distance in the tyre axial direction between the outer tread edge (To) and the inner tread edge (Ti) of the tyre 1 in the standard state.

Each of a groove width (W1$a$) of the outer shoulder main groove 3, a groove width (W1$b$) of the inner shoulder main groove 4, a groove width (W1$c$) of the outer crown main groove 5, and a groove width (W1$d$) of the inner crown main groove 6 is in a range of from 4% to 7% of the tread width TW, for example. The groove width (W1$a$) of the outer shoulder main groove 3 is the smallest of the groove widths of the plurality of the main grooves, for example. The groove width (W1$c$) of the outer crown main groove 5 is smaller than the groove width (W1$b$) of the inner shoulder main groove 4, for example. The groove width (W1$d$) of the inner crown main groove 6 is the largest of the groove widths of the plurality of the main grooves, for example. Such a distribution of the groove widths is helpful for improving the steering stability on a dry road surface and the on-snow performance in a good balance. In a case of a pneumatic tyre, it is preferred that each of the main grooves 3 to 6 has a groove depth in about a range of from 5 to 10 mm, for example. However, the dimensions of the main grooves 3 to 6 are not limited to such ranges.

By the provision of the main grooves 3 to 6 described above, the tread portion 2 is divided into a plurality of land regions. The tread portion 2 in this embodiment is divided into an outer shoulder land region 8, an inner shoulder land region 9, an outer middle land region 10, a crown land region 11, and an inner middle land region 12. The outer shoulder land region 8 is defined between the outer shoulder main groove 3 and the outer tread edge (To). The inner shoulder land region 9 is defined between the inner shoulder main groove 4 and the inner tread edge (Ti). The outer middle land region 10 is defined between the outer shoulder main groove 3 and the outer crown main groove 5. The crown land region 11 is defined between the outer crown main groove 5 and the inner crown main groove 6. The inner middle land region 12 is defined between the inner shoulder main groove 4 and the inner crown main groove 6.

Figure 2:
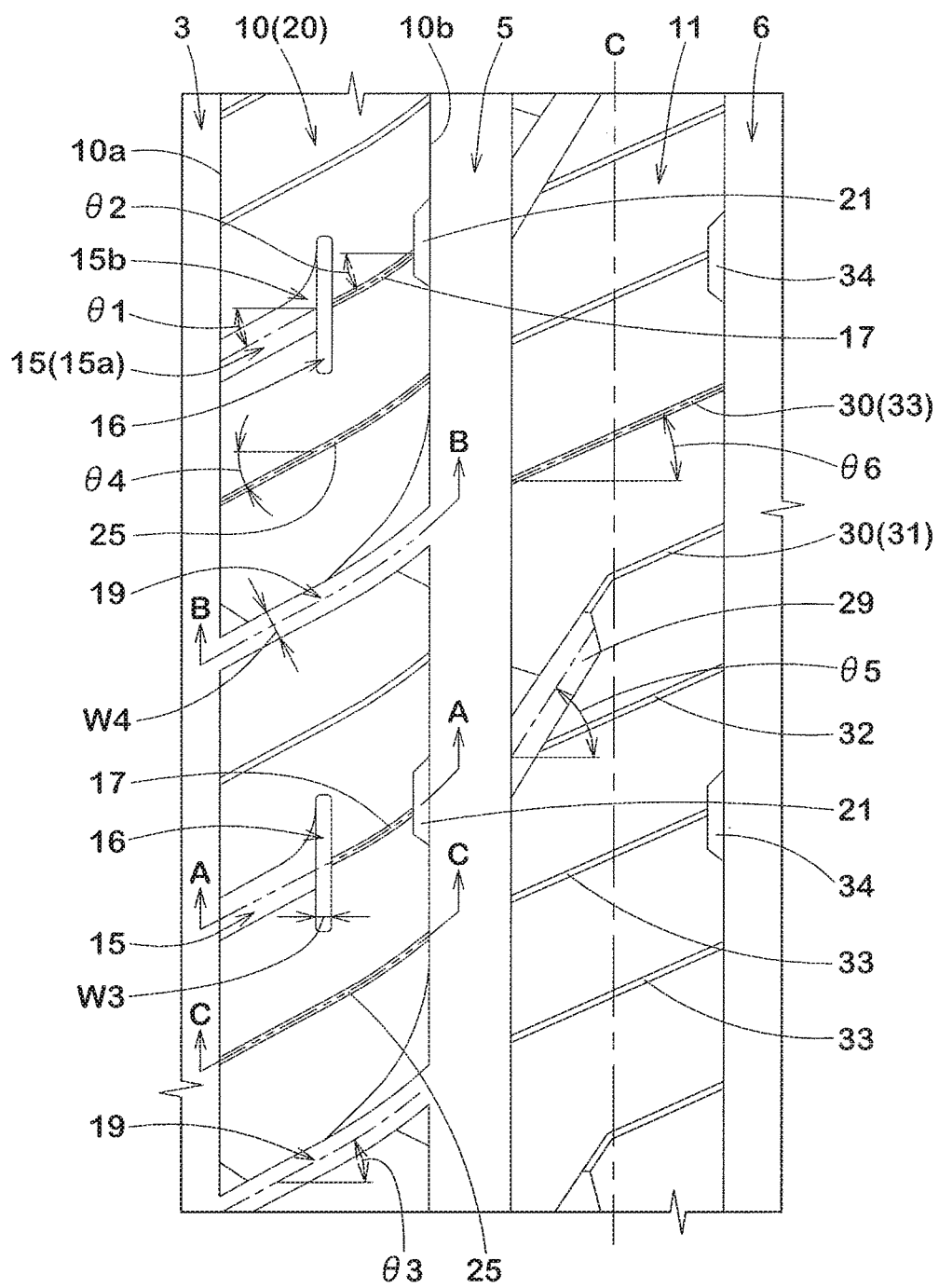
FIG. 2 is an enlarged view of an outer middle land region and a crown land region.

FIG. 2 is an enlarged view of the outer middle land region 10 and the crown land region 11 as an example of the land regions. As shown in FIG. 2, the outer middle land region 10 is defined between a first edge (10$a$) and a second edge (10$b$). The first edge (10$a$) in this embodiment is an edge extending in a tyre circumferential direction on a side of the outer tread edge (To). The second edge (10$b$) is an edge extending in the tyre circumferential direction on a side of the tyre equator (C).

Figure 3:
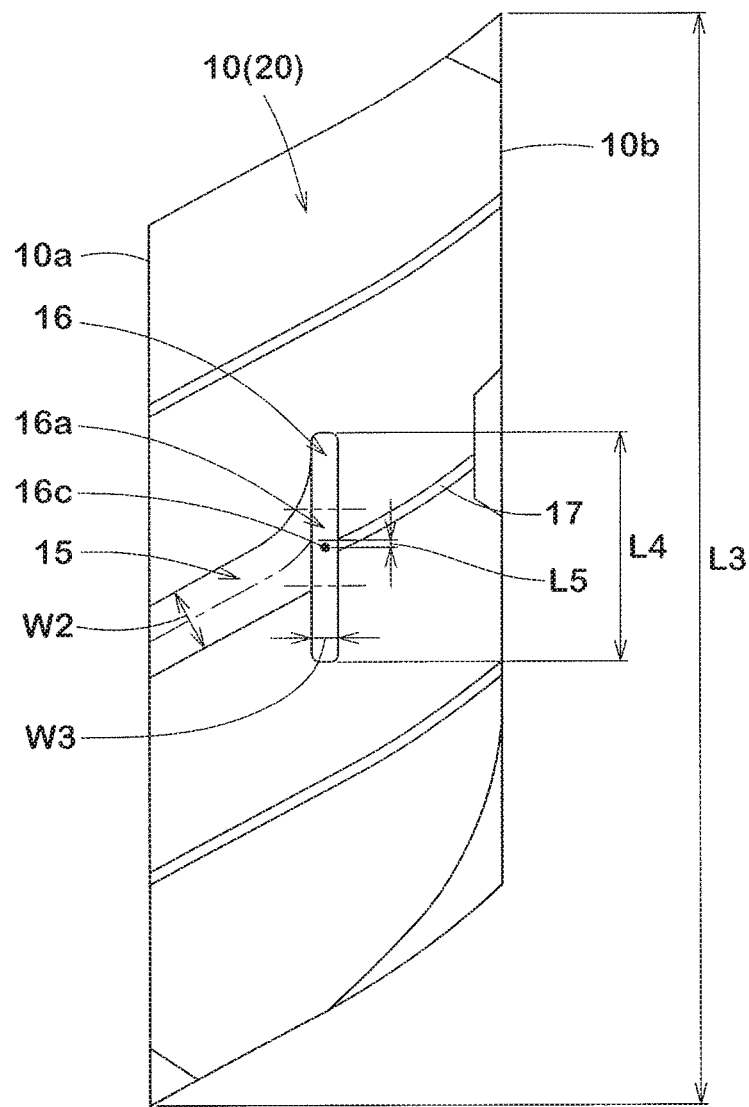
FIG. 3 is an enlarged view of one of first lateral grooves and one of vertical grooves.

The outer middle land region 10 is provided with first lateral grooves 15, vertical grooves 16, and sipes 17. FIG. 3 is an enlarged view of these. As shown in FIG. 3, each of the first lateral grooves 15 extends from the first edge (10$a$) toward the second edge (10$b$) and terminates within the land region. Each of the vertical grooves 16 is connected with a respective one of the first lateral grooves 15 and extends in the tyre circumferential direction to have both end portions thereof terminating within the land region. Each of the sipes 17 is connected with a respective one of the vertical grooves 16 and extends therefrom toward the second edge (10$b$). Note that the "sipe" in this specification means an incision having a width of less than 1.5 mm.

During running on a snowy road, the first lateral grooves 15 and the vertical grooves 16 compress snow therein and then shear it, therefore, large traction is provided. Particularly, in connection portions of the first lateral grooves 15 and the vertical grooves 16, snow is compressed more firmly, therefore, large snow shearing force is exerted. Further, the sipes 17 make it easy for the land regions in the vicinity of the vertical grooves moderately deform, therefore, the snow compressed in the first lateral grooves 15 and the vertical grooves 16 is easily discharged by the deformation of the land regions, thereby, excellent on-snow performance is sustainably exerted.

In this embodiment, groove elements formed by the first lateral grooves 15, the vertical grooves 16, and the sipes 17 are arranged in the outer middle land region 10, however, the present invention is not limited to such an embodiment, and the groove elements may be arranged in any other land regions.

As shown in FIG. 2, the first lateral grooves 15, the vertical grooves 16, and the sipes 17 in this embodiment are arranged in each of blocks 20 divided by through grooves 19 each completely crossing the land region, for example.

The first lateral grooves 15 are inclined with respect to the tyre axial direction, for example. An angle θ1 with respect to the tyre axial direction of each of the first lateral grooves 15 is preferably 45 degrees or less and specifically in a range of from 25 to 35 degrees, for example. It is possible that the first lateral grooves 15 configured as such improve not only the on-snow traction but also cornering performance during running on a snowy road.

It is preferred that each of the first lateral grooves 15 includes a part in which a groove width thereof is increased as it goes toward the vertical grooves 16, for example. Each of the first lateral grooves 15 in this embodiment, for example, has a constant width portion (15a) extending from the first edge (10a) at a constant groove width and a widened portion (15b) having an increased groove width and connected with the constant width portion on a side of a respective one of the vertical grooves 16 and the widened portion (15b) is connected with the respective vertical groove 16. It is possible that the first lateral grooves 15 configured as such further suppress snow from being clogged therein.

It is preferred that a groove width W2 (shown in FIG. 3) of each of the first lateral grooves 15 is in a range of from 0.40 to 0.65 times the groove width of the main groove on the side of the first edge (10a) (in this embodiment, the groove width (W1a) of the outer shoulder main groove 3 shown in FIG. 1), for example. It is possible that the first lateral grooves 15 configured as such improve the steering stability on a dry road surface and the on-snow performance in a good balance.

Each of the vertical grooves extends so as to have an inclination angle of 20 degrees or less, more preferably 10 degrees or less with respect to the tyre circumferential direction, for example, and in this embodiment, they extend in parallel with the tyre circumferential direction. Further, the vertical grooves 16 extend linearly. However, they are not limited to such an embodiment, and each of the vertical grooves 16 may extend in a zigzag manner, for example.

It is preferred that each of the vertical grooves 16 has a groove width W3 smaller than that of each of the first lateral grooves 15, for example. It is preferred that the groove width W3 of each of the vertical grooves 16 is 0.50 times or less of the groove width W2 of each of the first lateral grooves 15, and specifically, it is preferred that it is in a range of from 0.30 to 0.45 times the groove width W2, for example.

As shown in FIG. 3, it is preferred that a length L4 in the tyre circumferential direction of each of the vertical grooves 16 is at least smaller than a length L3 in the tyre circumferential direction of each of the blocks 20. It is preferred that the length L4 of each of the vertical grooves 16 is half or less of the length L3, and specifically it is preferred that it is in a range of from 0.10 to 0.30 times the length L3, for example. It is possible that the vertical grooves 16 configured as such exert excellent on-snow performance while maintaining the steering stability on a dry road surface.

When each of the vertical grooves 16 is divided into three groove portions having the same length in the tyre circumferential direction, it is preferred that a center groove portion (16a) positioned at the center in the tyre circumferential direction of the three groove portions is connected with a respective one of the first lateral grooves 15 in this embodiment. Further, in a preferred embodiment, it is preferred that a distance L5 in the tyre circumferential direction between an end on a side of the second edge (10b) of a groove center line of each of the first lateral grooves 15 and a center position (16c) in the tyre circumferential direction of a respective one of the vertical grooves 16 is smaller than the groove width W2 of each of the first lateral grooves 15. Further, it is preferred that the distance L5 is in a range of from 0.05 to 0.20 times the groove width W2. Thereby, it is possible that snow is firmly compressed in the center groove portions (16a) of the vertical grooves 16, therefore, large snow shearing force is exerted.

It is preferred that each of the Sipes 17 extends between a respective one of the vertical grooves 16 and the second edge (10b), for example. It is possible that the sipes 17 configured as such further suppress snow from being clogged in the first lateral grooves 15 and the vertical grooves 16.

It is preferred that each of the sipes 17 is connected with the center groove portion (16a) of a respective one of the vertical grooves 16, for example. Thereby, at least a part of each of the sipes 17 is in a region obtained by extending a respective one of the first lateral grooves 15 in a longitudinal direction thereof. Further, in a preferred embodiment, the entire sipe 17 is in the region described above. Thereby, it is possible that the above-described effects are further increased.

It is preferred that the sipes 17 are inclined in the same direction as the first lateral grooves 15 with respect to the tyre axial direction, for example. An angle θ2 of each of the sipes 17 with respect to the tyre axial direction is in a range of from 25 to 35 degrees, for example. In this embodiment, a difference between the angle θ1 with respect to the tyre axial direction of each of the first lateral grooves 15 and the angle θ2 with respect to the tyre axial direction of each of the sipes 17 is less than 10 degrees. The sipes 17 configured as such make it easy for the first lateral grooves 15 to open, therefore, it is possible that the snow is further suppressed from being clogged in the first lateral grooves 15 and the vertical grooves 16.

Figure 4A:
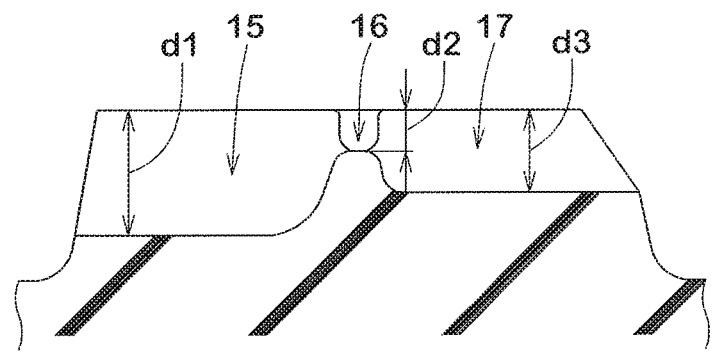
FIG. 4A is a cross-sectional view taken along A-A line of FIG. 2.

FIG. 4A is a cross-sectional view of one of the first lateral grooves 15, one of the vertical grooves 16, and one of the sipes 17 taken along A-A line of FIG. 2. As shown in FIG. 4A, each of the vertical grooves 16 has a depth smaller than that of each of the first lateral grooves 15, for example. A depth (d2) of each of the vertical grooves 16 is in a range of from 0.20 to 0.50 times a depth (d1) of each of the first lateral grooves 15, for example. The vertical grooves 16 configured as such are helpful for improving the steering stability on a dry road surface and the on-snow performance in a good balance.

Each of the sipes 17 has a depth smaller than that of each of the first lateral grooves 15, for example. Further, each of the sipes 17 has the depth larger than that of each of the vertical grooves 16. Specifically, a depth (d3) of each of the sipes 17 is in a range of from 0.50 to 0.80 times the depth (d1) of each of the first lateral grooves 15, for example.

As shown in FIG. 2, the outer middle land region 10 has chamfered portions 21 each including an inclined surface positioned between a ground contacting surface and a side wall on a side of the second edge (10b) of the outer middle land region 10. Further, is preferred that each of the sipes 17 extends to a respective one of the chamfered portions 21. During running on a snowy road surface, the outer crown main groove 5 form hard snow blocks in the vicinity of the chamfered portions 21, therefore, large snow shearing force is provided. Further, the chamfered portions 21 connected with the sipes 17 are easily deformed moderately, therefore, it is possible that snow is suppressed from being clogged in the main grooves.

The through grooves 19 provided in the outer middle land region 10 are inclined in the same direction with respect to the tyre axial direction as the first lateral grooves 15, for example. It is preferred that an angle θ3 of each of the through grooves 19 with respect to the tyre axial direction is in a range of from 20 to 35 degrees, for example.

Each of the through grooves 19 has a groove width larger than that of each of the vertical grooves 16, for example. Specifically, it is preferred that a groove width W4 of each of the through grooves 19 is in a range of from 1.5 to 2.5 times the groove width W3 of each of the vertical grooves 16.

Figure 4B:
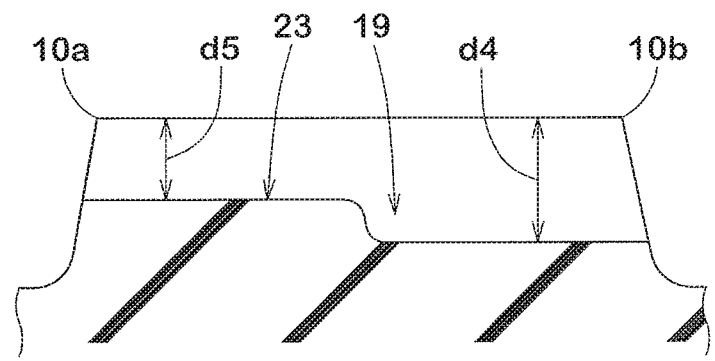
FIG. 4B is a cross-sectional view taken along B-B line of FIG. 2.

FIG. 4B is a cross-sectional view of one of the through grooves 19 taken along B-B line of FIG. 2. As shown in FIG. 4B, each of the through grooves 19 has a raised portion 23 formed by raising a part of a groove bottom on a side of the first edge (10a), for example. A depth (d5) of the raised portion 23 is in a range of from 0.60 to 0.70 times a maximum depth (d4) of each of the through grooves 19, for example. Further, a width in the tyre axial direction of the raised portion 23 is in a range of from 0.40 to 0.60 times a width in the tyre axial direction of the outer middle land region 10, for example. It is possible that the raised portions 23 configured as such suppress the through grooves 19 from excessively opening, therefore, the steering stability on a dry road surface is improved eventually.

As shown in FIG. 2, it is preferred that the outer middle land region 10 is provided with through sipes 25 each completely crossing the land region, for example. In each of the blocks 20, one through sipe 25 is provided on one side in the tyre circumferential direction of the first lateral groove 15 and one through sipe 25 is provided on the other side in the tyre circumferential direction of the first lateral groove 15, for example. It is possible that the through sipes 25 provide large frictional force during running on an icy road surface.

The through sipes 25 are inclined in the same direction as the first lateral grooves 15, for example. It is preferred that an angle θ4 with respect to the tyre axial direction of each of the through sipes 25 is in a range of from 20 to 30 degrees, for example.

Figure 4C:
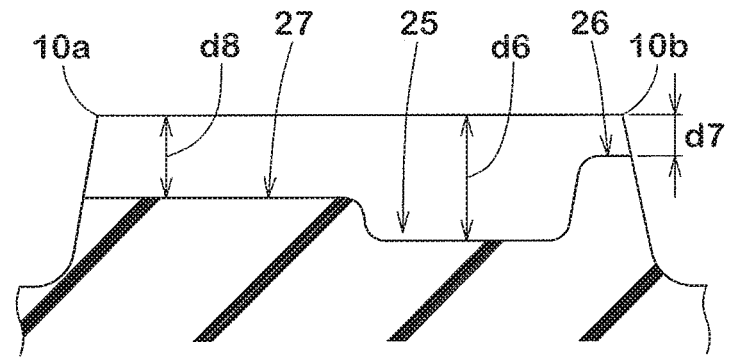
FIG. 4c is a cross-sectional view taken along c-c line of FIG. 2.

FIG. 4c is a cross-sectional view of one of the through sipes 25 taken along C-C line of FIG. 2. As shown in FIG. 4C, each of the through sipes 25 includes a first raised portion 26 formed by raising a part of a bottom portion on a side of the second edge (10b) of the through sipe 25 and a second raised portion 27 formed by raising a part of the bottom portion on a side of the first edge (10a) of the through sipe 25, for example. A depth (d7) of the first raised portion 26 is in a range of from 0.25 to 0.40 times a maximum depth (d6) of each of the through sipes 25, for example. A depth (d8) of the second raised portion 27 is in a range of from 0.60 to 0.75 times the maximum depth (d6) of each of the through sipes 25, for example. It is possible that each of the raised portions suppresses a respective one of the through sipes 25 from opening excessively, therefore, it is possible that the on-snow performance and on-ice performance are improved while the steering stability on a dry road surface is maintained.

It is preferred that the second raised portion 27 has a width in the tyre axial direction larger than that of the first raised portion 26, for example. The width in the tyre axial direction of the second raised portion 27 in this embodiment is equal to the width of the raised portion 23 of each of the through grooves 19. The through sipes 25 configured as such, together with the through grooves 19, increase rigidity of a part of the outer middle land region 10 on a side of the outer tread edge (To), therefore, it is possible that the steering stability on a dry road surface is improved.

As shown in FIG. 2, the tread portion 2 has the crown land region 11 as another land region adjacent to the outer middle land region 10 with the outer crown main groove 5, which is arranged on the side of the second edge (10b) of the outer middle land region 10, therebetween.

The crown land region 11 is provided with second lateral grooves 29, for example. Each of the second lateral grooves 29 extends from the outer crown main groove 5 toward the inner tread edge (Ti) to terminate within the crown land region 11, for example. The second lateral grooves 29 in this embodiment terminate without crossing the tyre equator (C), for example.

The second lateral grooves 29 are inclined with respect to the tyre axial direction in the same direction as the first lateral grooves 15, for example. It is preferred that an angle θ5 with respect to the tyre axial direction of each of the second lateral grooves 29 is larger than the angle θ1 with respect to the tyre axial direction of each of the first lateral grooves 15, for example. Specifically, it is preferred that the angle θ5 is in a range of from 50 to 70 degrees. It is possible that the second lateral grooves 29 configured as such improve the cornering performance during running on a snowy road surface.

It is preferred that, in this embodiment, a region obtained by extending each of the sipes 17 along a longitudinal direction thereof overlaps with an end portion of a respective one of the second lateral grooves 29. Further, in a preferred embodiment, the end portion of the respective second lateral groove 29 overlaps with a region obtained by extending a corresponding one of the chamfered portions 21 of the outer middle land region 10 inwardly in the tyre axial direction. Thereby, it is possible that hard snow blocks are formed in the vicinity of the second lateral grooves 29 and the chamfered portions 21 and that snow is suppressed from being clogged in the second lateral grooves 29.

The crown land region 11 is provided with a plurality of crown sipes 30. Each of the crown sipes 30 is inclined in the same direction as the first lateral grooves 15, for example. It is preferred that an angle θ6 of each of the crown sipes 30 is in a range of from 20 to 30 degrees, for example.

The crown sipes 30 include first crown sipes 31, second crown sipes 32, and third crown sipes 33, for example. Each of the first crown sipes 31 extends between the other end portion of a respective one of the second lateral grooves 29 and the inner crown main groove 6, for example. Each of the second crown sipes 32 is connected with a respective one of the second lateral grooves 29 on a side of the outer tread edge (To) of a respective one of the first crown sipes 31 and extends therefrom to the inner crown main groove 6, for example. Each of the third crown sipes 33 completely crosses the crown land region 11, for example. Such an arrangement of each of the crown sipes 30 are helpful for improving the steering stability on a dry road surface and the on-snow performance in a good balance while suppressing uneven wear of the land region.

The crown land region 11 is provided with crown chamfered portions 34 each including an inclined surface positioned between a ground contacting surface and a side wall on a side of the inner crown main groove 6 of the crown land region 11. It is preferred that an end portion on a side of the inner tread edge (Ti) of each of the third crown sipes 33 is connected with a respective one of the crown chamfered portions 34. Thereby, it is less likely for snow to be clogged in the inner crown main groove 6, therefore, excellent on-snow performance is sustainably exerted.

Figure 5:
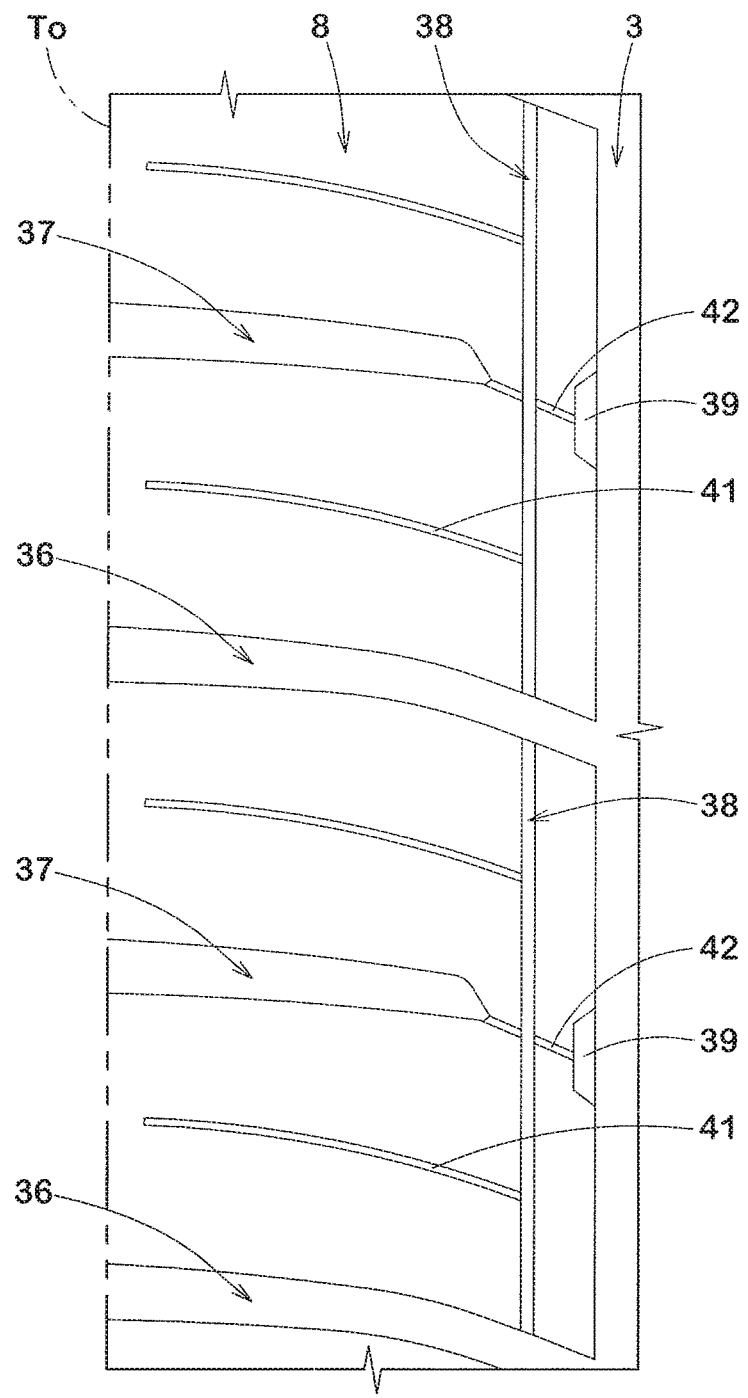
FIG. 5 is an enlarged view of an outer shoulder land region of FIG. 1.

FIG. 5 is an enlarged view of the outer shoulder land region 8. As shown in FIG. 5, the outer shoulder land region 8 is provided with a plurality of first outer shoulder lateral grooves 36 and second outer shoulder lateral grooves 37, for example.

Each of the first outer shoulder lateral grooves 36 extends between the outer tread edge (To) and the outer shoulder main groove 3, for example. It is preferred that the first outer shoulder lateral grooves 36 are inclined in a direction opposite to the first lateral grooves 15 with respect to the tyre axial direction, for example.

Each of the second outer shoulder lateral grooves 37 extends from the outer tread edge (To) toward the tyre equator (C) to terminate within the outer shoulder land region 8, for example. It is possible that the second outer shoulder lateral grooves 37 configured as such improve the on-snow performance while maintaining the steering stability on a dry road surface.

The outer shoulder land region 8 in this embodiment is provided with outer shoulder vertical narrow grooves 38, outer shoulder chamfered portions 39, first outer shoulder sipes 41, and second outer shoulder sipes 42.

Each of the outer shoulder vertical narrow grooves 38 extends between the first outer shoulder lateral grooves 36 adjacent to each other in the tyre circumferential direction, for example. In a preferred embodiment, each of the outer shoulder vertical narrow grooves 38 extends linearly in parallel with the tyre circumferential direction between a respective one of the second outer shoulder lateral grooves 37 and the outer shoulder main groove 3.

Each of the outer shoulder chamfered portions 39 includes an inclined surface positioned between a ground contacting surface and a side wall on a side of the outer shoulder main groove 3 of the outer shoulder land region 8. In a preferred embodiment, it is preferred that a region obtained by extending each of the outer shoulder chamfered portions 39 in the tyre axial direction overlaps with an end portion of a respective one of the first lateral grooves 15.

Each of the first outer shoulder sipes 41 extends in the tyre axial direction and is arranged between a respective pair of the first outer shoulder lateral groove 36 and the second enter shoulder lateral groove 37 adjacent to each other in the tyre circumferential direction, for example. Each of the first outer shoulder sipes 41 extends from a respective one of the outer shoulder vertical narrow grooves 38 toward the outer tread edge (To) and to terminate before reaching it, for example.

Each of the second outer shoulder sipes 42 extends between an end portion of a respective one of the second outer shoulder lateral grooves 37 and the outer shoulder main groove 3, for example. Each of the second outer shoulder sipes 42 in this embodiment is connected with a respective one of the outer shoulder chamfered portions 39, for example.

Figure 6:
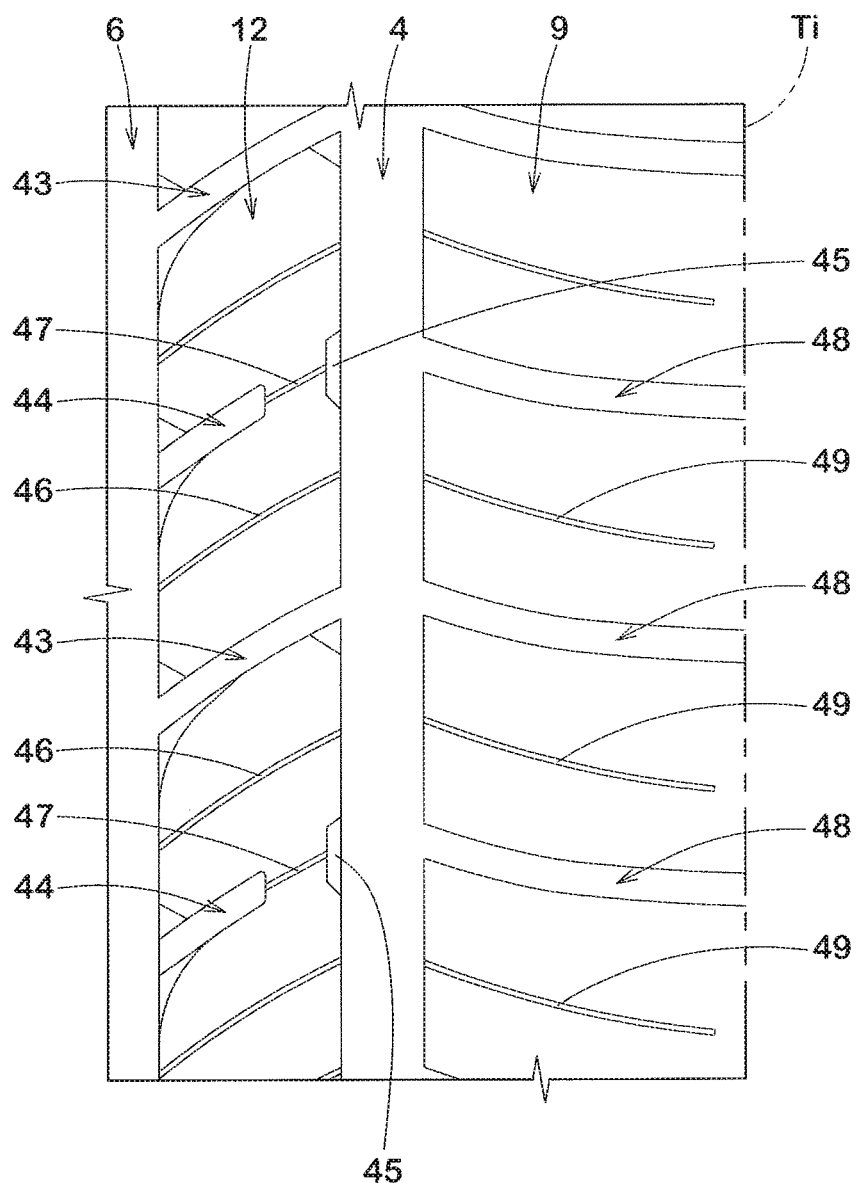
FIG. 6 is an enlarged view of an inner middle land region and an inner shoulder land region of FIG. 1.

FIG. 6 is an enlarged view of the inner middle land region 12 and the inner shoulder land region 9. As shown in FIG. 6, the inner middle land region 12 is provided with a plurality of first inner middle lateral grooves 43 and second inner middle lateral grooves 44. It is preferred that the first inner middle lateral grooves 43 and the second inner middle lateral grooves 44 are inclined in the same direction as the first lateral grooves 15, for example.

Each of the first inner middle lateral grooves 43 completely crosses the inner middle land region 12, for example. Each of the second inner middle lateral grooves 44 extends from the inner crown main groove 6 toward the inner tread edge (Ti) to terminate within the inner middle land region 12, for example.

The inner middle land region 12 in this embodiment is provided with inner middle chamfered portions 45, first inner middle sipes 46, and second inner middle sipes 47, for example.

Each of the inner middle chamfered portions 45 includes an inclined surface positioned between a ground contacting surface and a side wall on a side of the inner shoulder main groove 4 of the inner middle land region 12.

Each of the first inner middle sipes 46 is arranged between a respective pair of the first inner middle lateral groove 43 and the second inner middle lateral groove 44 adjacent to each other in the tyre circumferential direction, for example. Each of the first inner middle sipes 46 is inclined in the same direction as the first inner middle lateral grooves 43 with respect to the tyre axial direction and completely crosses the inner middle land region 12, for example.

Each of the second inner middle sipes 47 extends between a respective one of the second inner middle lateral grooves 44 and the inner shoulder main groove 4, for example. In a preferred embodiment, each of the second inner middle sipes 47 is connected with a respective one of the inner middle chamfered portions 45. The second inner middle sipes 47 configured as such make it easy for parts of the land region in the vicinity of the inner middle chamfered portions 45 to deform, therefore, it is possible that snow is suppressed from being clogged in the inner shoulder main groove 4 eventually.

The inner shoulder land region 9 is provided with a plurality of inner shoulder lateral grooves 48 and inner shoulder sipes 49, for example.

Each of the inner shoulder lateral grooves 48 extends between the inner tread edge Ti and the inner shoulder main groove 4, for example. In a preferred embodiment, a region obtained by extending an end portion of each of the inner shoulder lateral grooves 48 in the tyre axial direction overlaps with a respective one of the first inner middle lateral grooves 43 or the inner middle chamfered portions 45. Thereby, it is possible that harder snow blocks are formed in the inner shoulder main groove 4.

Each of the inner shoulder sipes 49 extends from the inner shoulder main groove 4 toward the inner tread edge (Ti) to terminate before reaching it, for example. It is preferred that the inner shoulder sipes 49 in this embodiment are inclined in a direction opposite to the first lateral grooves 15, for example.

Figure 7:
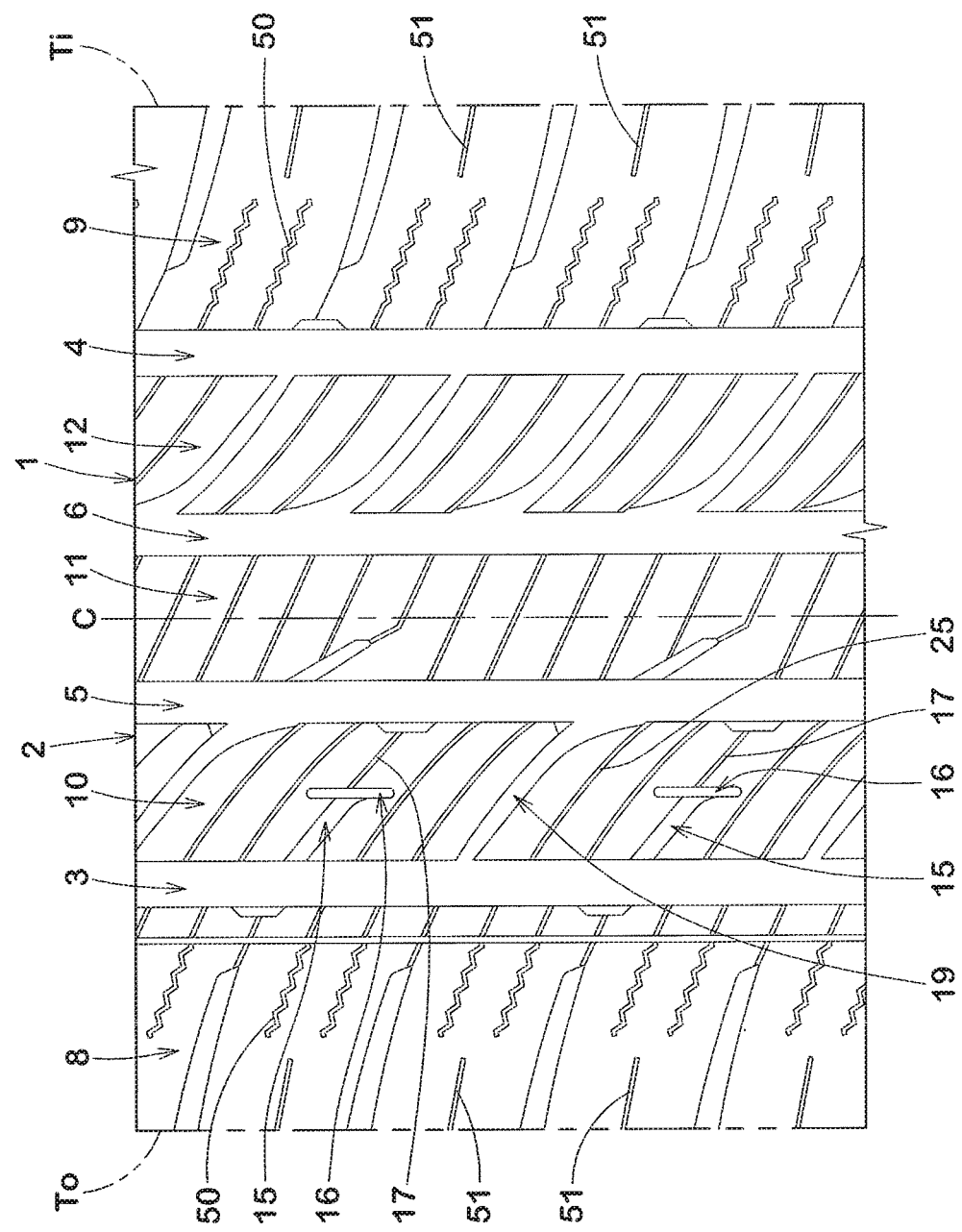
FIG. 7 is a development view of the tread portion of the tyre according to another embodiment of the present invention.

FIG. 7 is a development view of the tread portion 2 of the tyre 1 according to another embodiment of the present invention. In this embodiment, the same reference numerals are given to the elements common to the above-described embodiment, and the explanation thereof is omitted here.

The outer middle land region 10 in this embodiment is provided with a plurality of through sipes 25 between each pair of the first lateral groove 15 and the through groove 19 adjacent to each other in the tyre circumferential direction. Such an arrangement of the through sipes 25 is helpful for further improving the on-ice performance.

It is preferred that the outer shoulder land region 8 and the inner shoulder land region 9 is provided with zigzag sipes 50, for example. Further, it is preferred that each of the zigzag sipes 50 is a semi-open sipe having one end connected with one of the grooves and the other end terminating within the land region. The zigzag sipes 50 configured as such suppress decrease in rigidity of the land region, therefore, it is possible that the steering stability on a dry road surface is maintained.

It is preferred that the outer shoulder land region 8 and the inner shoulder land region 9 is provided with a plurality of tread edge side sipes 51 each extending from the outer tread edge (To) or the inner tread edge (Ti) toward the tyre equator (c) to terminate within the respective land region.

While detailed description has been made of an embodiment of the present invention, the present invention can be embodied in various forms without being limited to the illustrated embodiments.

WORKING EXAMPLES (EXAMPLES)

Figure 8:
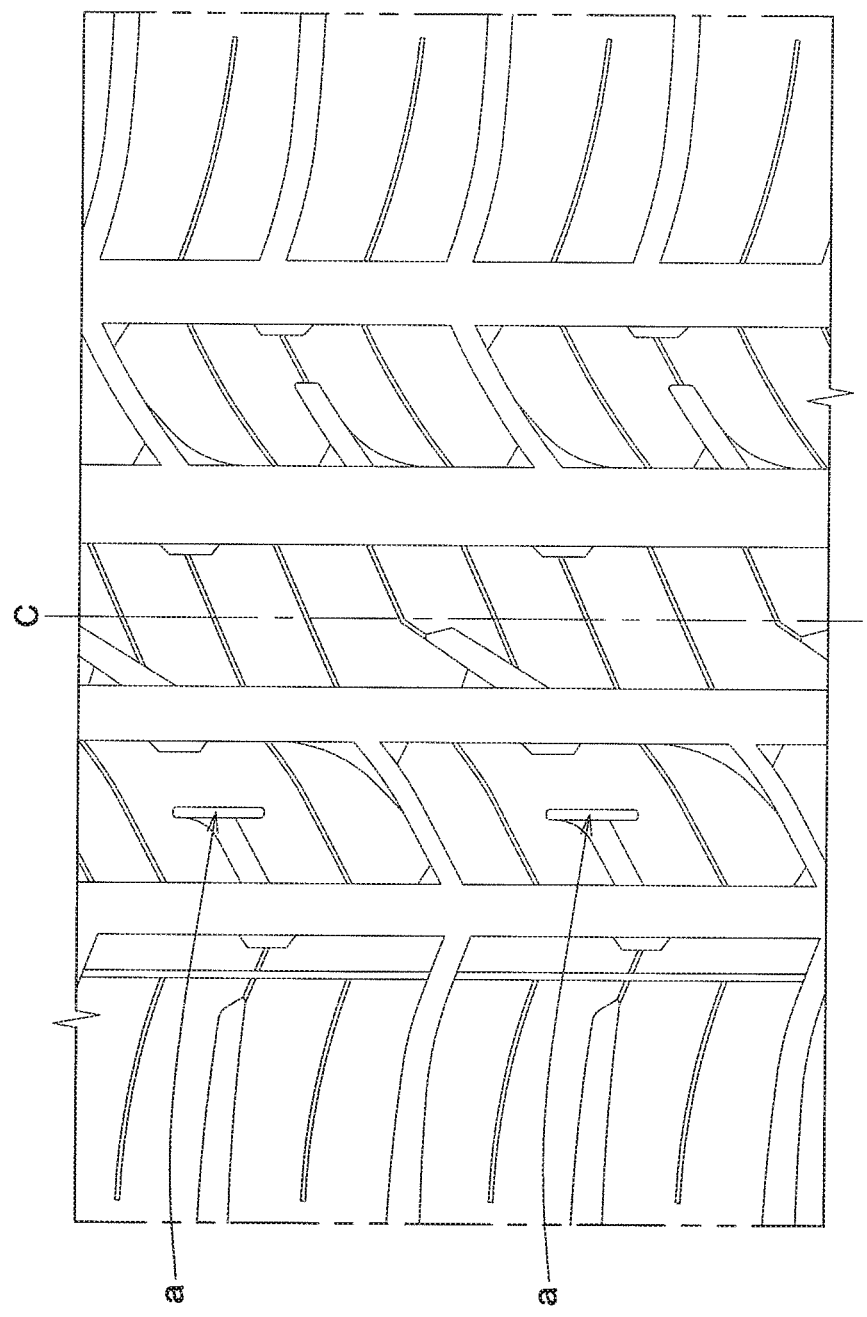
FIG. 8 is a development view of the tread portion of the tyre as Reference.

Pneumatic tyres of size 215/60R16 having the basic tread pattern shown in FIG. 1 were made by way of test according to the specification listed in Table 1. As Reference, as shown in FIG. 8, tyres in which no sipes are connected with vertical grooves (a) of the outer middle land region were made by way of test. Each of the test tyres was tested for the on-snow performance and the steering stability on a dry road surface. Common specifications of the test tyres and the test methods are as follows.

Tyre rim: 16×6.5J
Tyre inner pressure: 220 kPa
Test vehicle: front wheel drive car with a displacement of 2500 cc <On-Snow Performance>

While a driver drove the test vehicle on a snowy road surface, running performance was evaluated by the driver's feeling. The test results are indicated by an evaluation point based on the Reference being 100, wherein the larger the numerical value, the more sustainably excellent on-snow performance is exerted.

<Steering Stability on Dry Road Surface>

While a test driver drove the test vehicle on a dry road surface, the steering stability was evaluated by the driver's feeling. The results are indicated by an evaluation point based on the Reference being 100, wherein the larger the numerical value, the better the steering stability on a dry road surface is.

The test results are shown in the Table 1.

TABLE 1

|  | Ref | Ex. 1 | Ex. 2 | Ex. 3 | Ex. 4 | Ex. 5 | Ex. 6 | Ex. 7 | Ex. 8 | Ex. 9 |
| --- | --- | --- | --- | --- | --- | --- | --- | --- | --- | --- |
| Figure showing tread pattern | FIG. 8 | FIG. 1 | FIG. 1 | FIG. 1 | FIG. 1 | FIG. 1 | FIG. 1 | FIG. 1 | FIG. 1 | FIG. 1 |
| Depth (d2) of Vertical groove/ Depth (d1) of First lateral groove | 0.33 | 0.33 | 0.20 | 0.25 | 0.40 | 0.50 | 0.33 | 0.33 | 0.33 | 0.33 |
| Length L4 of Vertical groove/ Length L3 of Block | 0.21 | 0.21 | 0.21 | 0.21 | 0.21 | 0.21 | 0.10 | 0.15 | 0.25 | 0.30 |
| On-snow performance [evaluation point] | 100 | 107 | 105 | 106 | 107 | 108 | 105 | 107 | 107 | 108 |
| Steering stability on dry road surface [evaluation point] | 100 | 100 | 100 | 100 | 100 | 98 | 100 | 100 | 100 | 99 |

From the test results, it was confirmed that the tyres as Examples sustainably exerted excellent on-snow performance. Further, it was confirmed that the steering stability on a dry road surface is maintained in the tyres as the Example.

The invention claimed is:

1. A tire comprising a tread portion comprising:
a land region defined between a first edge extending in a tire circumferential direction and a second edge extending in the tire circumferential direction, wherein
the land region is provided with
a first lateral groove extending from the first edge toward the second edge and terminating within the land region,
a vertical groove, connected with the first lateral groove, extending in the tire circumferential direction and having two end portions terminating within the land region, and
a sipe connected with the vertical groove and extending therefrom toward the second edge,
wherein the two end portions of the vertical groove are closed ends not connected to any sipes or grooves.

2. The tire according to claim 1, wherein
the first lateral groove is inclined with respect to a tire axial direction.

3. The tire according to claim 1, wherein
the first lateral groove includes a portion in which a groove width thereof increases toward the vertical groove.

4. The tire according to claim 3, wherein
the first lateral groove has a constant width portion extending from the first edge at a constant groove width, and
the portion having the increased groove width connects between the constant width portion and the vertical groove.

5. The tire according to claim 1, wherein
the vertical groove has a depth smaller than that of the first lateral groove.

6. The tire according to claim 1, wherein
the sipe extends to the second edge.

7. The tire according to claim 1, wherein
the sipe has a depth larger than that of the vertical groove.

8. The tire according to claim 1, wherein
at least a part of the sipe is in a region obtained by extending the first lateral groove in a longitudinal direction thereof.

9. The tire according to claim 1, wherein
the first lateral groove and the sipe are inclined in a same direction with respect to a tire axial direction.

10. The tire according to claim 1, wherein
the land region has a chamfered portion including an inclined surface positioned between a ground contacting surface and a side wall on a side of the second edge of the land region, and
the sipe extends to the chamfered portion.

11. The tire according to claim 1, wherein
the tread portion includes another land region adjacent to the land region with a main groove arranged on a side of the second edge of the land region therebetween, and
said another land region is provided with a second lateral groove connected with the main groove.

12. The tire according to claim 11, wherein
the sipe is connected with the main groove, and
a region obtained by extending the sipe along a longitudinal direction thereof overlaps with an end portion of the second lateral groove.

13. The tire according to claim 1, wherein
when a position of the tread portion mounted on a vehicle is specified, the tread portion includes an outer tread edge positioned on an outer side of the vehicle, the second edge extends in the tire circumferential direction on a side of the outer tread edge of a tire equator, and the first edge extends in the tire circumferential direction between the outer tread edge and the second edge.

14. The tire according to claim 13, wherein
the tread portion includes an outer shoulder land region positioned on a side of the outer tread edge of the land region,
the outer shoulder land region is provided with an outer shoulder chamfered portion, and
a region obtained by extending the outer shoulder chamfered portion in a tire axial direction overlaps with an end portion of first lateral groove.

15. The tire according to claim 1, wherein
the vertical groove has a groove width smaller than that of the first lateral groove.

16. The tire according to claim 1,
wherein the vertical groove is divided into three groove portions having a same length in the tire circumferential direction, and the first lateral groove is connected with a center groove portion positioned at a center in the tire circumferential direction of the three groove portions, and wherein the sipe is oriented with respect to a tire axial direction at an angle $\theta 2$ between 25° to 35° and a difference between an angle $\theta 1$ at which the first lateral groove is oriented with respect to the tire axial direction and the angle $\theta 2$ is less than 10°.

17. The tire according to claim 16, wherein
a distance in the tire circumferential direction between an end of a groove center line of the first lateral groove at a second edge side and a center position of the vertical groove in the tire circumferential direction is smaller than a groove width of the first lateral groove.

18. The tire according to claim 16, wherein
the sipe is connected with the center groove portion.

19. The tire according to claim 1, the land region further comprising:
through grooves completely crossing the land region, the through grooves being separated in the circumferential direction to define blocks,
wherein one of the blocks includes the first lateral groove, the vertical groove and the sipe.

20. The tire according to claim 1,
wherein the vertical groove is connected to only one first lateral groove and to only one sipe.

* * * * *